April 25, 1933.   N. D. STURGES   1,905,319
STORAGE BATTERY
Filed Feb. 4, 1932
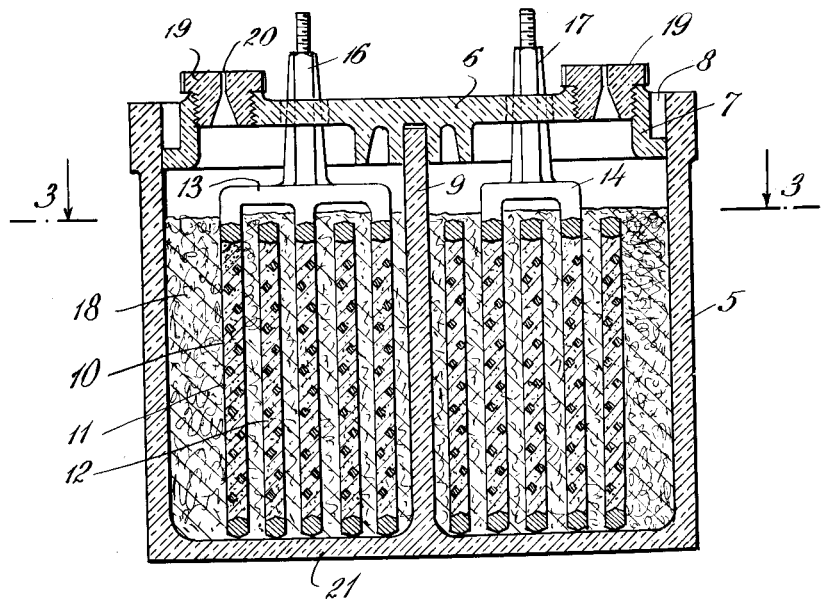
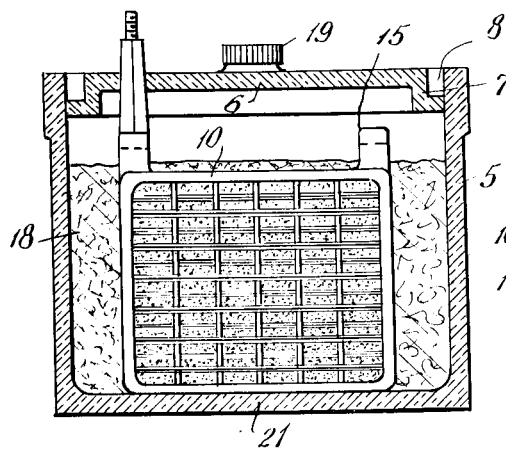
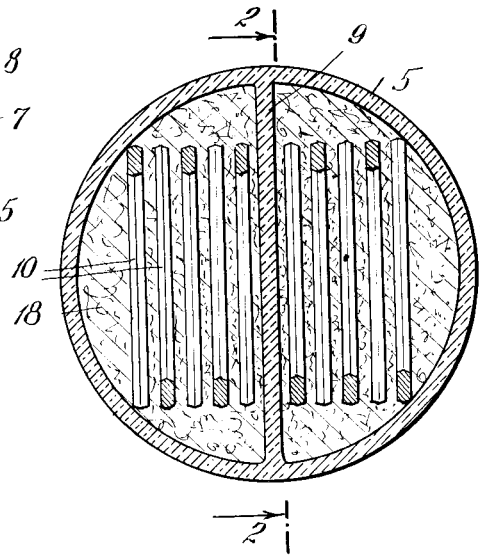
INVENTOR
Norman Dexter Sturges
BY
Pennie Davis Marvin & Edmonds
ATTORNEYS Patented Apr. 25, 1933

1,905,319

UNITED STATES PATENT OFFICE

NORMAN DEXTER STURGES, OF NEW YORK, N. Y.

STORAGE BATTERY

Application filed February 4, 1932. Serial No. 590,808.

This invention relates to storage batteries, and particularly to portable batteries.

Sulphuric acid which is employed in the electrolyte of lead storage batteries is strongly corrosive, and since such batteries must be open to permit the escape of gas there is always danger of spilling the electrolyte. Consequently the uses of storage batteries have been limited to such as ensure relative stability.

Many attempts have been made to avoid the disadvantages of liquid electrolytes in storage batteries. So-called jelly electrolytes have been tried. It has also been suggested to employ kieselguhr, paper, or wood pulp as an absorbent for the electrolyte. None of the suggested batteries have met with any success for various reasons which need not be here enumerated in detail. It is sufficient to point out that rapid deterioration destroys the effectiveness and consequently the value of batteries heretofore suggested which included non-liquid electrolytes.

I have discovered, however, that by employing a suitable material as an absorbent for the electrolyte, the deterioration may be avoided and that batteries including such material disclosed by actual test long and efficient life under the most strenuous conditions of discharge and recharge. Indeed, while the particular advantage of the invention lies in the portability of the battery, it has advantages also for use in batteries which are not subjected to unusual changes of position. The battery is simplified by the elimination of the usual separators, and its life is extended by preventing the accumulation of sludge and consequently short-circuiting. The plates may be less rugged than is otherwise necessary and the cost of the battery is thereby further reduced.

In carrying out the invention, I may employ the usual elements of a storage battery, i. e., a suitable receptacle and the customary plates comprising lead grids which are pasted with a mixture of red lead and litharge. This mixture when the plates are formed is converted into peroxide of lead on the positive plates and reduced to spongy lead on the negative plates. The plates are suitably connected to the terminals of the battery.

As an absorbent for the electrolyte, for example sulphuric acid, 29.0 Bé., I employ material derived from bagasse, a refuse from the extraction of the juice of the sugar cane. Such material is described in Letters Patent Nos. 1,501,925 and 1,572,565. It may be prepared by subjecting the crude bagasse to partial cooking sufficient only to loosen the encrusting casing which surrounds the fibres, the cooking being so limited as to avoid the removal of any substantial proportion of the pith naturally present in the fibres. The cooking may be conducted in various ways, and with different reagents. As an example of the procedure, the bagasse is heated in a solution containing caustic soda in the proportion of about 2% of the bone dry weight of the bagasse for a period of from 1 to 3 hours at atmospheric pressure and at a temperature of from approximately 150° to 212°. F. Stronger alkali solutions may be used if the time of cooking is reduced. It is also possible to employ solutions of sulphites or sulphates of the alkali metals with suitable modification of the temperature and time of cooking.

The product of the operation as described is distinguished from pulp such as that suitable for paper making in that such pulp is fully cooked to separate substantially pure cellulose fibres from the raw material, whereas the material which I employ is not reduced to cellulose fibres. It consists of the rough, partially cooked bagasse fibres released from the encrusting material but containing substantially all of the pith. This material readily forms a felt corresponding substantially to wool felt. It is highly absorbent, and for the present purpose has the extremely desirable characteristic of being substantially unaffected by the sulphuric acid solution employed as the electrolyte. Whereas paper or wood pulp is readily attacked by sulphuric acid, the present material retains its form and structure even after exposure to the sulphuric acid electrolyte corresponding to the life of a storage battery, that is, two or three years in continuous service.

The bagasse material and the process of preparing it form no part of the present invention, which resides more particularly in a storage battery in which such material surrounds and is interposed between the plates of the battery, replacing the usual separators and acting in addition as an absorbent for the electrolyte so that none of the latter will escape from the battery even though it is over-turned accidentally or otherwise. Such batteries are admirably adapted for various uses, such, for example, as a source of current in lanterns, particularly those employed by railroad men. Obviously a storage battery containing a liquid electrolyte cannot be used in such devices where the battery would be subjected to violent changes of position. Batteries embodying the present invention may be over-turned without loss of the electrolyte, and of course the user is not endangered as he would be in similarly employing a battery containing a liquid electrolyte.

The battery as herein described has been subjected to severe tests to determine its life and efficiency. It has been proved to be at least as efficient as similar batteries with liquid electrolytes. Under continuous discharging and recharging the battery maintains its efficiency. Examination of the filling material after use for extended periods shows that it is unaffected by the acid of the electrolyte. The battery can be used, therefore, until the plates through normal processes of deterioration have disintegrated as in all storage batteries.

The invention will be better understood by reference to the accompanying drawing, in which Fig. 1 is a transverse section through a battery embodying the invention;

Fig. 2 is a vertical section on the line 2—2 of Fig. 3; and

Fig. 3 is a horizontal section on the line 3—3 of Fig. 1.

Referring to the drawing, 5 indicates a casing which may be of any suitable material such as hard rubber or other acid-resistant composition. A cover 6 is provided with a sealing flange 7 affording a space 8 which may be filled with any suitable sealing composition. The cover 6 engages and forms a seal with a dividing wall 9 extending transversely across the receptacle 5 and dividing it into two compartments or cells. It will be understood that if additional cells are desired suitable division walls will be provided.

In each cell I provide a plurality of grids 10 which, in accordance with the usual practice, are pasted with a mixture of litharge and red lead. The positive and negative plates 11 and 12 thus provided may be formed either before or after the battery is assembled. During forming, the mixture of litharge and red lead is converted into peroxide of lead on the positive plates 11 and into spongy lead on the negative plates 12. The positive plates 11 and the negative plates 12 in each cell are connected at opposite ends thereof by straps 13 and 14, and the positive plates in one cell are connected by means of a strap 15 to the negative plates in the adjacent cell, thus providing a series connection. The positive plates 11 in one cell are connected to a post 16, and the negative plates in the adjacent cell are connected to a post 17, the posts extending through the cover 6 and thus affording an external connection to the source of current.

The receptacle 5 is substantially filled with the partially cooked bagasse material 18 which surrounds and is interposed between the plates in each cell. Sufficient acid electrolyte of suitable strength, for example sulphuric acid 29.0 Bé. is introduced to each cell through removable caps 19 which are threadedly connected in suitable openings in the cover 6. Each of the caps 19 has a vent 20 through which any gas formed within the cells can escape.

The plates 11 and 12 rest upon the bottom 21 of the receptacle 5, it being unnecessary to provide raised supports for the plates as in ordinary storage battery construction. In the battery as herein described, the absorbent material which surrounds and is interposed between the plates prevents the falling of any particles of the pasted material and consequently no sludge can collect in the bottom of the battery. Short circuiting through the accumulation of sludge as in ordinary storage batteries is avoided by the filling of absorbent material.

Various changes may be made in the form and arrangement of the battery receptacle and of the plates and other details of the battery without departing from the invention or sacrificing any of the advantages thereof.

I claim:

A lead storage battery comprising a container, positive and negative plates within the container having terminals connected thereto, a filling surrounding and interposed between the plates consisting of bagasse fibres partially cooked to loosen the encrusting casing and containing a substantial portion of the pith naturally present in the fibres, and an electrolyte absorbed in the filling material.

In testimony whereof I affix my signature.

NORMAN DEXTER STURGES.